March 21, 1950 H. P. LINDFORS 2,501,229
GRAIN ELEVATOR BUCKET
Filed Aug. 19, 1948
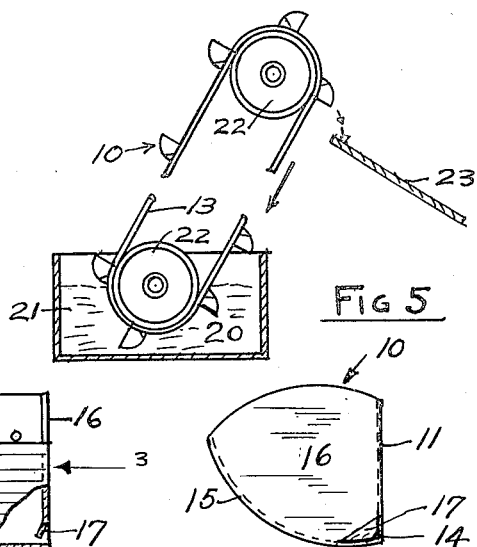
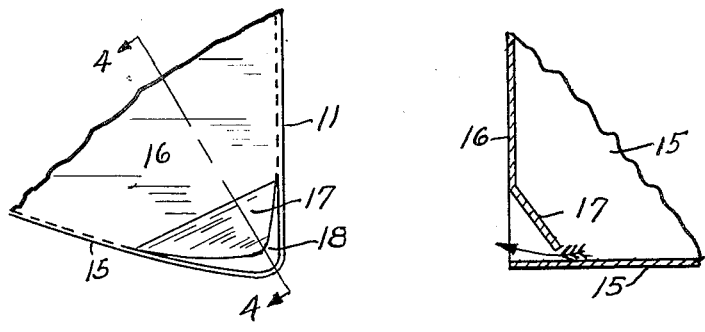
INVENTOR.
HOWARD P. LINDFORS
BY Martin E Anderson
ATTORNEY Patented Mar. 21, 1950

2,501,229

UNITED STATES PATENT OFFICE 2,501,229

GRAIN ELEVATOR BUCKET

Howard P. Lindfors, Denver, Colo.

Application August 19, 1948, Serial No. 45,155

2 Claims. (Cl. 198—152)

This invention relates to improvements in elevator buckets and has reference more particularly to the type of buckets employed in connection with grain elevators.

In the handling of grain in grain elevators, the grain is raised from the lower level to the top by means of bucket elevators. Bucket elevators are also used in many other places for transferring grain from one bin to another and during the unloading of grain trucks and the loading of the same.

Buckets ordinarily employed in connection with such elevating devices are constructed of metal and have one side secured to a conveyor belt or sprocket chain. The usual buckets are airtight and when used in connection with grain, such as wheat, they fail to fill with grain because, due to the speed at which they move through the grain, the air trapped in the buckets does not have time to escape with the result that the buckets operate at much less than their maximum capacity. Such airtight buckets also frequently fail to discharge the grain because the speed is so high that the time element does not permit the air to penetrate and a considerable amount of grain is therefore retained in the bucket and is dropped therefrom at some point below the maximum elevation.

This invention relates to an improved bucket construction in which the air that would otherwise be trapped therein will have a free passage through which to escape and which will also permit air to enter freely at the time of discharge.

Another object of the invention is to produce what may be termed a ventilated bucket of such construction that grain of any kind will not flow outwardly through the ventilating openings.

Having thus briefly described the objects of the invention and the invention itself, the latter will now be described in greater detail and for this purpose reference will be had to the accompanying drawing in which the invention has been illustrated in its preferred form, and in which:

Figure 1 is a front elevation of a grain bucket constructed in accordance with this invention, a portion having been broken away to more clearly disclose the construction;

Figure 2 is an end elevation looking in the direction of arrow 2 in Figure 1;

Figure 3 is a fragmentary end elevation to substantially full size showing the construction of the bucket to obtain the ventilating feature above mentioned;

Figure 4 is a section taken on line 4—4, Figure 3; and

Figure 5 is a diagrammatic view showing, in a general way the construction of the elevating device to which this bucket is applied.

In the drawing reference numeral 10 designates the bucket in its entirety. The bucket has a straight rear wall 11 that is provided with a plurality of openings 12 by means of which it may be secured to a conveyor belt 13. The part forming the back is bent along line 14 and curves upwardly forming the front wall 15. Ends 16, of the proper shape to fit the cross section of the bucket, are welded to the end edges of parts 11 and 15, as shown in Figures 2 and 3. The shape of the finished bucket is substantially the same as that of similar buckets now in use.

In order to permit air to escape and enter the bucket so as to permit it to fill quickly and to empty completely, the lower pointed corners of the ends adjacent the angle 14, are left unattached in the manner shown in Figure 3, thereby forming a triangular part 17 that is then bent inwardly as shown in Figure 4. This leaves an angular opening 18 through which air may leave, as indicated by the arrow in Figure 4 and through which air may enter when the bucket is emptied. It is, of course, obvious that so far as air entering and leaving is concerned, any form of opening might be provided. In handling grain and seed, however, it is necessary to form this opening in such a way that the grain or seed will not flow outwardly through the same. If the buckets were used for handling water, it is evident that the water would flow readily through opening 18; since grain and seed are handled instead of water, they will not flow outwardly because when a small amount of grain flows through the opening it fills the same and forms what may be termed a dam that effectively prevents the grain from flowing. It will be observed that the opening is long and comparatively narrow and that the corner portion 17 is inwardly inclined as shown in Figure 4. These two features make it possible to provide a considerable opening for the outward and inward passage of air sufficient to effect the desired results, and which will positively prevent any appreciable escape of grain during operation.

Referring now to Figure 5, grain 20 has been shown as confined in a box or bin 21, a belt conveyor 13 is provided with a plurality of buckets 10 encircling the two pulleys 22, and then the elevator is operated in the direction of the arrow, the buckets will drop down into the grain and when they are provided with ventilating openings, they will become filled completely with grain. The grain is then carried upwardly to a point at the top or down below the top of the upper pulley, whereupon the centrifugal force and the action of gravity will cause the grain to be discharged onto a chute or launder 23. Due to the ventilating openings in the ends of the buckets, the grain will be free to leave and as a result the bucket will empty completely at a point above the launder.

By this means of the simple expedient shown on the drawing and described herein the capacity of an elevating mechanism of the bucket type can be increased to almost double its usual capacity due to the fact that the buckets will fill completely and empty completely. Because the buckets are ventilated in the manner shown and described, the elevator can be operated at a much higher speed than if the buckets were unventilated due to the free passage of air to and from the bottom of the buckets.

Having described the invention what is claimed as new is:

1. A ventilated grain elevator bucket formed from sheet material, and of substantially triangular cross section, the rear wall being substantially flat and the front wall outwardly convex, end walls attached to the front and back, the tips of the end walls being free and inwardly ranging, providing an angular opening for the free exit and entrance of air.

2. A ventilated grain elevator bucket of substantially triangular cross section having correspondingly shaped ends, the tip of the ends being unattached to the sides of the bucket and inwardly ranging to provide angular openings about the tips for the free exit and entrance of air during the filling and emptying of the buckets, that portion of the wall of the bucket on the outside of the inwardly ranging tips serving as a shelf for grain passing through the opening, the grain on the outside of said tips serving to obstruct the outward flow of grain.

HOWARD P. LINDFORS.

REFERENCES CITED

The following references are of record in the file of this patent:

UNITED STATES PATENTS

| Number | Name | Date |
|---|---|---|
| 2,031,064 | Ponting et al. | Feb. 18, 1936 |
| 2,169,750 | Weller | Aug. 15, 1939 |
| 2,200,507 | Kozak | May 14, 1940 |